W. KELLEY.

Signals for Locomotive Head-Lights.

No. 8,591. Reissued Feb. 18, 1879.

Attest:
Alexander Pope
D. P. Cowl

Inventor:
William Kelley,
by Wm. H. W. J. Howard,
Attorneys.

UNITED STATES PATENT OFFICE.

WILLIAM KELLEY, OF BALTIMORE, MARYLAND.

IMPROVEMENT IN SIGNALS FOR LOCOMOTIVE HEAD-LIGHTS.

Specification forming part of Letters Patent No. 209,405, dated October 29, 1878; Reissue No. 8,591, dated February 18, 1879; application filed January 22, 1879.

*To all whom it may concern:*

Be it known that I, WILLIAM KELLEY, of the city of Baltimore, in the State of Maryland, have invented certain new and useful Improvements in Signals for Locomotive Head-Lights; and I do hereby declare that the following is a full, clear, and exact description of my invention, which will enable others skilled in the art to which it appertains to make and use the same, reference being had to the accompanying drawings, and to the letters of reference marked thereon, which form a part of this specification.

My invention relates to a signal which may be exhibited, as desired, at the head-light of a locomotive, to indicate that the train is immediately followed by another, or as a danger-signal, or for other purposes.

The invention is designed to be used as either a day or a night signal; and consists, first, in combining with the head-light lantern colored front and side glass plates, the projecting rim or flange holding the glass of the lantern being provided with side openings or windows, through which a diffused light is thrown from the interior of the lantern for the purpose of producing side signals. Heretofore side signal-lights have been obtained through openings cut in the respective sides of the lantern and parabolic reflector, the light having been thrown directly through said openings, or reflected from the respective inner concave surfaces of the reflector. Considerable trouble and expense attend such a construction, and besides at the openings cut in the reflector dark spots are shown. I have found by experience that a diffused light is equally as well adapted for effecting the side signals as a directly-reflected light; and the first part of my invention aims to produce an efficient side light without resorting to the expedient of cutting the reflector.

The invention consists, secondly, in combining with the head-light lantern framed colored glass plates hinged together in pairs, each pair forming a front and a side signal, and being adapted to be placed at and removed from the face parts of the lantern.

The invention consists, thirdly, in providing the projecting rim or flange of the lantern with side openings, over which are fitted fixed glass plates for the purpose of allowing side signal-lights to be shown.

The invention consists, fourthly, in certain mechanical details whereby the framed colored glass plates mentioned in the above description of the second part of my invention may be moved to and from the face of the lantern.

Figure 1:
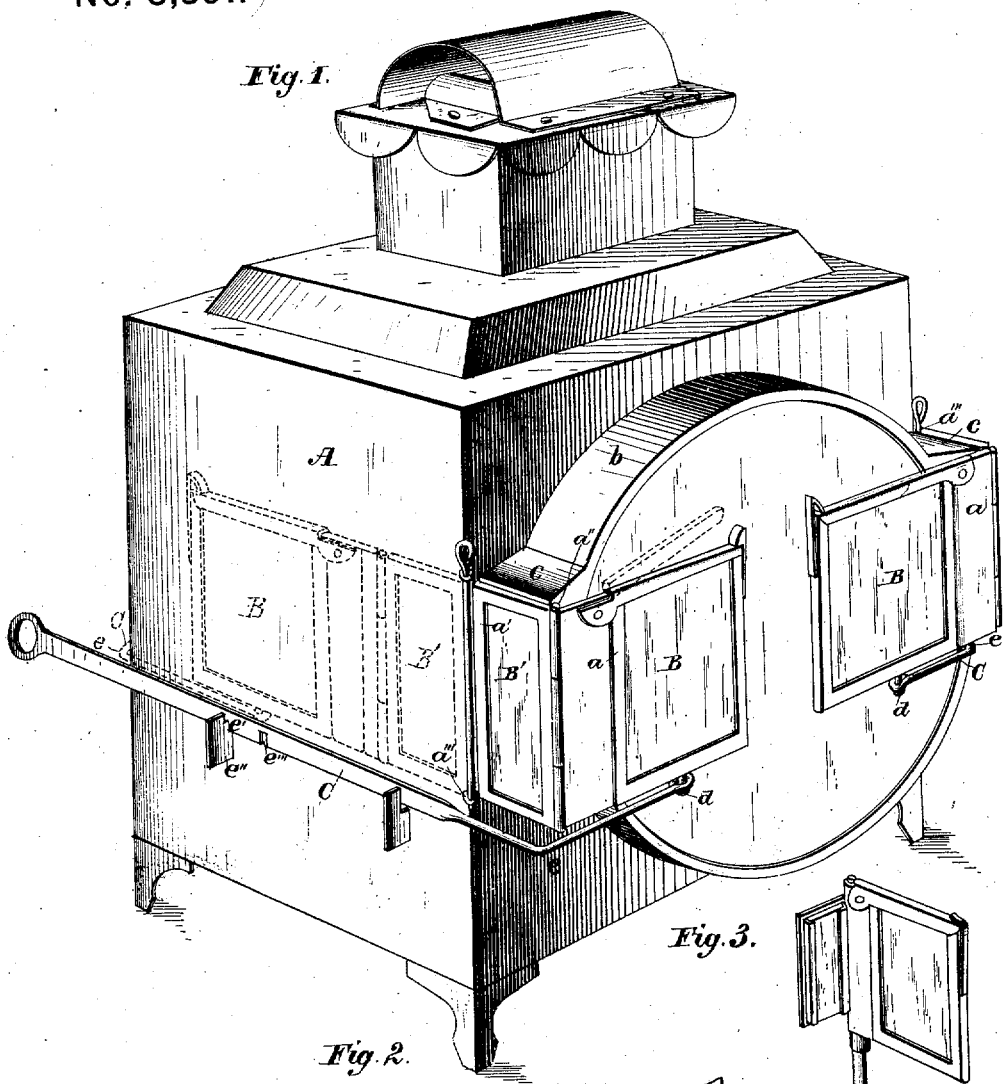
Figure 3:
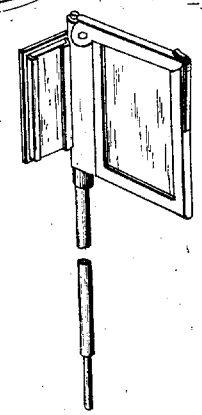
Figure 2:
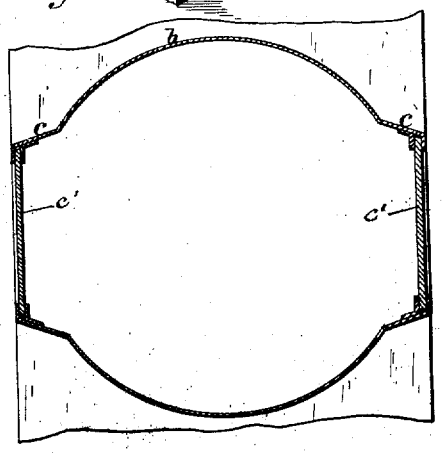

In the accompanying drawings, Figure 1 is a perspective view of the head-light lantern, in which the framed colored glass plates aforesaid are shown in their two positions—viz., in front of the lantern and removed therefrom—the latter adjustment being shown in dotted lines, as will be readily understood. Fig. 2 is a vertical section through the projecting rim or flange of the lantern, showing the side openings and glass plates fixed over the same. Fig. 3 is a perspective view of a detail of the invention, hereinafter described.

Similar letters of reference indicate similar parts in all the views.

A is the head-light lantern. B B′ are red-glass plates, inclosed in frames *a a′*. The frames *a a′* are hinged or leaved together at *a″*. The pair of frames are hinged to the lantern at *a‴*. The plates B form the front signals, standing when in position in front of the lantern-face, as shown in Fig. 1 by the full lines, the plates B′ forming at the same time the side signals, and occupying positions over the windows cut, respectively, in the two sides of the rim or flange *b*. The said windows are surrounded by frames *c*, soldered to the rim or flange *b*, the frames *c* extending out to the sides of the lantern. The windows are covered by glass plates *c′* fixed over the same.

C C are rods, loosely connected to the frames *a* by means of the pins *d*. The rods C are bent to right angles at *e*, and when the signal-plates B B′ are at the front parts of the lantern have the position shown in Fig. 1, being hooked at the notches *e′* over the stops *e″*. When, however, the signal-plates are moved to the position shown in the said figure by dotted lines, the notch *e‴* is fitted to a stop similar to *e″*, situated at the back of the lantern.

It will be understood that the hinge *a″* allows the plates B B′ to be brought flat against the sides of the lantern, as shown by the dotted lines in Fig. 1.

Fig. 3 shows a standard provided with a front and a side signal-plate, secured thereto. This may be used by simply inserting the lower end of the standard in a socket formed in the base-board of the lantern. The construction shown in Fig. 1 is, however, that preferred by me, by reason of its greater convenience.

The upper sections of the frames receiving the glass plates are hinged, and the plates slipped into the frames, as shown and claimed as of my invention in my Letters Patent No. 207,284, dated August 20, 1878. The present invention is designed for application to such head-light to which the invention described in the said Letters Patent would be inapplicable, and also to furnish a side light, not provided for in my said former invention.

In this invention, as in my said former one, the glass plates serve as a day or a night signal, the color of the frame-work being made to correspond with the color of the plates.

The chief advantage attending the use of this improvement is in the great saving to the railroad company using it of lamps of different kinds and the oil necessary to supply them. For signals of different significations, glass plates of different colors may be used, in accordance with the rules governing railroad signaling.

I claim as new and wish to secure by Letters Patent of the United States—

1. A head-light lantern having its front projecting rim or flange provided with side openings or windows, combined with colored front and side glass plates, substantially as and for the purpose specified.

2. A head-light lantern having its front projecting rim provided with side openings or windows, combined with colored front and side glass plates united or hinged together, and adapted to be placed in front of said lantern and over the side windows thereof and removed therefrom, substantially as and for the purposes specified.

3. Combined with a head-light lantern having its front projecting rim provided with side openings or windows, colored front and side glass plates, hinged or leaved together, and adapted when not in use to be swung back against the side walls of the lantern by means substantially as herein described.

4. A head-light lantern having its front projecting rim provided with side openings or windows, combined with glass plates fixed over said openings or windows, substantially as shown and described, for the purpose of allowing side lights to be exhibited as signals, as specified.

5. Combined with a head-light lantern having its front projecting rim or flange laterally perforated, as described, frames *c* and glass plates *c'* fixed therein, substantially as set forth.

6. The head-light lantern A, combined with the plates B B' and rods C C, the said plates being hinged together and to the lantern, substantially as specified.

7. The head-light lantern A, plates B B', bent rods C C, notched as described, and stops *c''*, all combined substantially as specified.

In testimony whereof I affix my signature hereto in the presence of two subscribing witnesses this 2d day of January, 1879.

WILLIAM KELLEY.

Witnesses:
M. P. CALLAN,
GEO. H. HOWARD.